(12) United States Patent
Tolomeo

(10) Patent No.: US 6,915,677 B1
(45) Date of Patent: Jul. 12, 2005

(54) ADJUSTABLE RAIL FOR SHAPING LARGE SINGLE CURVATURE PARABOLIC MEMBRANE OPTIC

(75) Inventor: Jason Andrew Tolomeo, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 668 days.

(21) Appl. No.: 10/068,010

(22) Filed: Feb. 8, 2002

(51) Int. Cl.[7] .............................. G02B 5/10; G02B 7/188
(52) U.S. Cl. ........................ 72/380; 343/915; 359/846
(58) Field of Search .................... 72/380; 343/915; 359/846, 849

(56) References Cited

U.S. PATENT DOCUMENTS

| | | | |
|---|---|---|---|
| 4,022,523 A | * | 5/1977 | Lindonen et al. ........... 359/849 |
| 4,162,825 A | | 7/1979 | Dowty |
| 4,196,972 A | * | 4/1980 | Rawlings .................... 359/849 |
| 4,416,263 A | * | 11/1983 | Niedermeyer ............... 126/694 |
| 5,016,998 A | | 5/1991 | Butler |
| 6,113,242 A | | 9/2000 | Marker et al. |
| 6,208,317 B1 | * | 3/2001 | Taylor et al. ............... 343/915 |

* cited by examiner

Primary Examiner—Lowell A. Larson
(74) Attorney, Agent, or Firm—McDermott Will & Emery LLP

(57) ABSTRACT

A system for shaping a single curvature parabolic membrane. The system includes a shaping rail and a bending rail. At least two rollers operably connect the shaping rail and the bending rail. The rollers are operable to alter a position of the shaping rail relative to the bending rail. A compression adjustment bar is operably connected to ends of the shaping rail to apply a load to the shaping rail. A bending adjustment bar is operably connected to ends of the bending rail to apply a moment to the shaping rail through the at least two rollers.

30 Claims, 11 Drawing Sheets

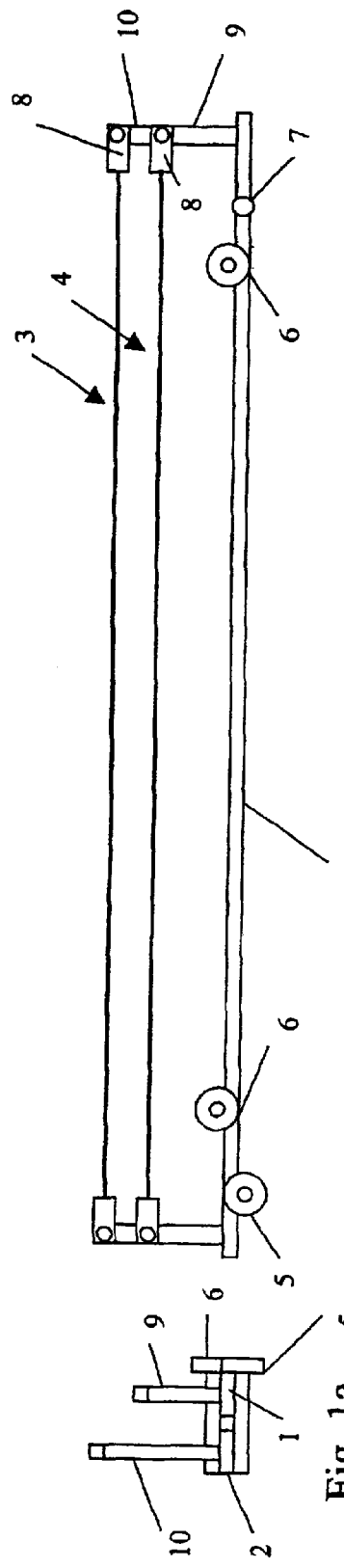
Fig. 1
Fig. 1a
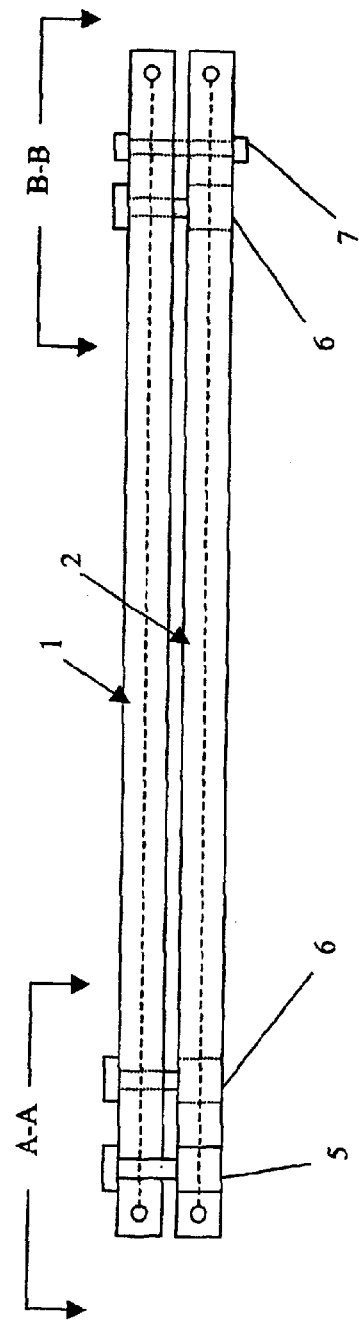
Fig. 2

ADJUSTABLE RAIL FOR SHAPING LARGE SINGLE CURVATURE PARABOLIC MEMBRANE OPTIC

FIELD OF THE INVENTION

The present invention relates to structures for supporting membranous elements. In particular, the present invention provides a support structure for use in supporting such membranous elements for optical telescopes, particularly space-based optical telescopes.

BACKGROUND OF THE INVENTION

Structures for reflecting electromagnetic radiation have been constructed utilizing a membranous element on an underlying structure that imparts a desired contour to the membranous element. Previous activity in this area has been concerned with shaping tensioned double curvature membranes. This cannot be achieved passively with known materials. Therefore, some sort of loading, pressure, or actuation on the interior region of the membrane surface is required to impart the desired shape to the membrane.

From the standpoint of thermodynamics and structural deformation such loading is undesirable since it introduces irregularities or obscurations on the optical surface at the interior of the membrane area, exactly where the optic is most sensitive. Therefore, complicated mechanical and thermal control systems must be designed as well as new materials and adhesives must be developed. The time frame for such development in the current Art has been postulated to be approximately 10–20 years. Also, very involved actuation control systems and new material developments are envisioned for known systems, which impose undesirable complexity and uncertainty to the overall optical design.

SUMMARY OF THE INVENTION

The present invention provides a system for shaping a single curvature parabolic membrane. The system includes a shaping rail and a bending rail. At least two rollers operably connect the shaping rail and the bending rail. The rollers are operable to alter a position of the shaping rail relative to the bending rail. A compression adjustment bar is operably connected to ends of the shaping rail to apply a load to the shaping rail. A bending adjustment bar is operably connected to ends of the bending rail to apply a moment to the shaping rail through the at least two rollers.

Also, the present invention concerns a single curvature parabolic membrane optic. At least two membrane shapers each include a shaping rail, a bending rail, at least two rollers operably connecting the shaping rail and the bending rail, the rollers being operable to alter a position of the shaping rail relative to the bending rail, and a bending adjustment bar operably connected to ends of the bending rail to apply a load to the shaping rail through the rollers. An optical membrane is stretched between the at least two membrane shapers. A compression adjustment bar is operably connected to the shaping rail to apply small corrective compressive loads and moments to the shaping rail.

Additionally, the present invention relates to a system for shaping a single curvature parabolic membrane. The system includes a shaping rail having a first end and a second end. The first end and the second end of the shaping rail are operably connected to each other such that the ends of the shaping rail may be brought closer together through the combined application of a bending moment and in-line compression.

Furthermore, the present invention provides a method for shaping a single curvature membrane optic. The method includes generating curvature in a shaping rail by applying a load and a moment in the vicinity of a first end and a second end of the shaping rail. An optical membrane is stretched between at least two shaping rails.

Still other objects and advantages of the present invention will become readily apparent by those skilled in the art from a review of the following detailed description. The detailed description shows and describes preferred embodiments of the present invention, simply by way of illustration of the best mode contemplated of carrying out the present invention. As will be realized, the present invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which:

FIG. 1 represents a side view of an embodiment of an adjustable rail system according to the present invention;

FIG. 1a represents an end view of the embodiment shown in FIG. 1;

FIG. 2 represents a top view of the embodiment shown in FIG. 1 in a stowed configuration;

DETAILED DESCRIPTION OF THE INVENTION

Figure 3:
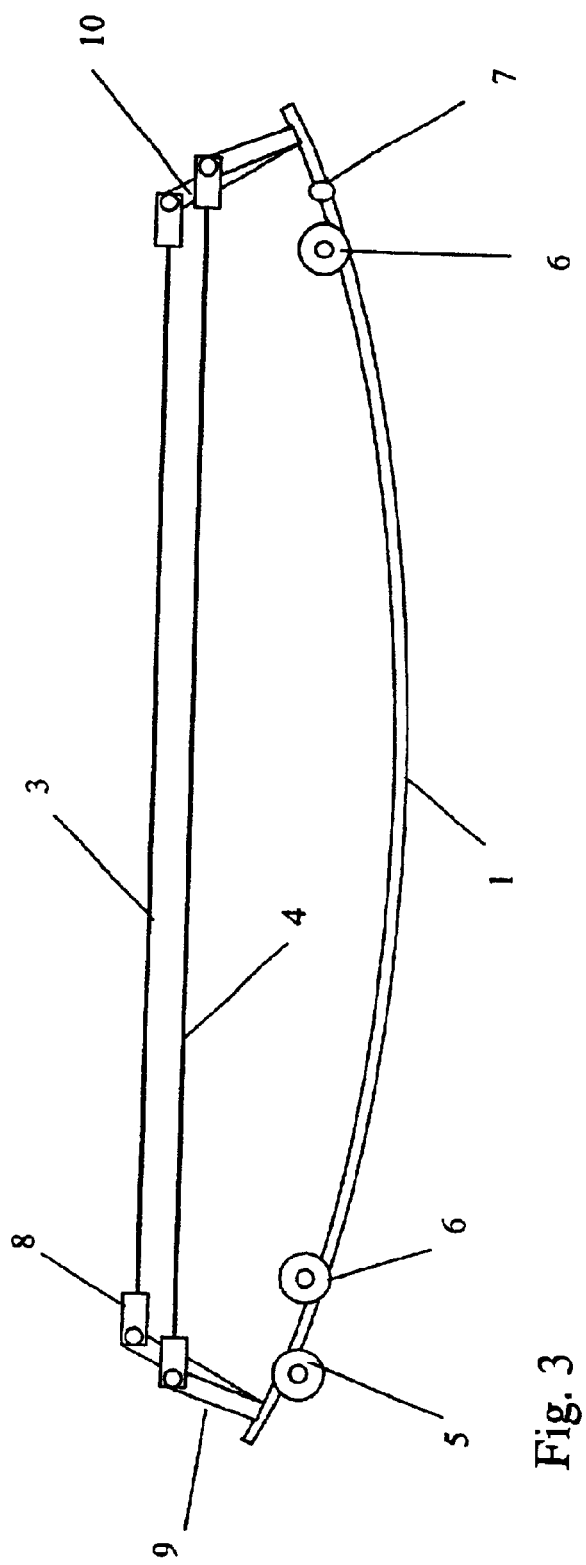
FIG. 3 represents a side view of the embodiment shown in FIGS. 1 and 2 in a deployed configuration.

Structures including a membranous element as described above have application both in ground and space based applications. However, they are particularly useful in space based applications. Along these lines the structure supporting the membranous element can be relatively lightweight. Lightweight structures are particularly employed in space.

This at least in part results from a need to limit the payload delivered to orbit to the capacity of a launch vehicle. Also, structures deployed in space encounter fewer stresses that earth-based structures and so require less reinforcement.

One particular purpose of the present invention is to provide a structure than can be employed to shape a thin membrane optic into a single curvature parabolic mirror. This has important application into the field of space telescopes and earth observing telescopes. Stretched membrane, or "Gossamer", optics are a key technology to develop the next generation of large aperture telescopes, such as on the order of 1 m, 10 m, and 50 m apertures, while being extremely light weight, such as on the order of about 0.1 kg/m$^2$.

The present invention provides a simple, lightweight, deployable, and scalable solution to form the figure of a single curvature membrane optic. The structure according to the present invention makes possible lightweight systems that can be folded into a conventional launch vehicle and then deployed in space. The structure according to the present invention has the capability to shape lightweight mirrors with apertures of on the order of about 50 m and areal density orders of magnitude lighter than known alternative structures. Structures according to the present invention may be utilized in membrane optics or "Gossamer" optics, deformable mirror structures, wavefront control of optical systems, and steering mirrors, among other structures.

Among the advantages of the present invention are that it can determine the shape from the boundary of a stretched membrane and does not need to contact important interior regions of the optical surface. The present invention is compatible with a tension application to the membrane that permits a natural frequency of the mirror to be adjusted. Additionally, a structure according to the present invention can have certain symmetry properties that permit the structure to be mounted kinematically to a surrounding structure while still imparting an adjustable shaping force and moment to the optical membrane.

Devices according to the present invention can be is extremely lightweight and efficient while also being scalable to very large deployable membrane apertures. Furthermore, a structure according to the present invention can utilize straight constant cross-section beams as the undeformed condition of the edge rail. This is an important discriminator since a flat constant cross section beam is typically much easier to fabricate to the extremely tight tolerances imposed by optical requirements. This makes the design according to the present invention cheap, easy to manufacture, and robust.

A device according to the present invention can provide an optimal combination of moment, shear, and in-line force that produces a parabolic shape to high degree of accuracy through a simple set of actuation sites. Additionally, the structure according to the present invention may be utilized in combination with edge actuation and control system for fine adjustment and control of optics such as could be attained with a distributed system along the rail length, such as a piezoelectric system. A further advantage of the present invention is that it has the potential to provide for large geometric reconfiguration of the optical prescription remotely or on-orbit, thus permitting modification to field of view and other aspects of a telescope design.

Still further advantages of the present invention is that it is scalable to very large apertures. The present invention can provide control over the optical figure from the edge with no obscuration of the optical element. Also, the present invention may be utilized for single curvature optics. Employing the present invention can provide simplified adjustments to achieve high accuracy parabolic shape. Additionally, a structure according to the present invention can deploy from a flat beam requiring very little space. Still further, the present invention can utilize a constant cross-section flat beam, which is typically more easily machined to tight tolerance. Further still, the present invention provides a structure that is compatible with more complicated actuation systems if desired. The structure according to the present invention can also allow rapid geometric reconfiguration of optical prescription on-orbit.

A structure according to the present invention provides a system for imparting a desired shape to a single curvature parabolic membrane. The system includes a shaping rail. The shaping rail may be acted upon to impart a desired shape to it. The shaping rail may be acted upon by biasing the ends of the shaping rail toward each other. Typically, for functional reflecting surfaces, a parabolic shape will be imparted to the shaping rail. However, various desired shapes may be imparted to the shaping rail. When another structure, such as an optical membrane is applied to the surface of the shaping rail, the structure will take on the contour of the shaping rail.

A shape may be imparted to the shaping rail by applying a load to the shaping rail. The load may be imparted to the shaping rail by operably connecting the ends of the shaping rail. The present invention may include a compression adjustment bar that interconnects the ends of the shaping rail. At least one of the connections between the shaping rail and the compression adjustment bar may be adjustable. This will permit a variable bending moment, shear, and inline force to be applied to the shaping rail to achieve the desired shape.

To facilitate application of the bending moment to the shaping rail, the present invention may include a bending rail. The bending rail may be arranged in parallel to the shaping rail in a stowed position. Elements that are fixable on the bending rail may permit application of the bending moment on the shaping rail. The elements can provide a surface against which the shaping rail can be drawn in application of the bending moment. The position of the elements on the bending rail may be altered to alter the location where the shaping rail engages the elements.

A bending moment may also be applied to the bending rail. The bending moment may be applied to the bending rail by applying force to bring the ends of the bending rail toward each other. A shape may be imparted to the bending rail by applying a load to the bending rail. The load may be imparted to the bending rail by operably connecting the ends of the bending rail. The present invention may include a bending adjustment bar that interconnects the ends of the bending rail. At least one of the connections between the bending rail and the bending adjustment bar may be adjustable. In the preferred embodiment, this will permit a bending moment to applied to the bending rail to achieve a desired pure moment input to the attached shaping rail to achieve an on-axis parabola.

FIG. 1 illustrates an embodiment of a system for shaping a single curvature parabolic membrane according to the present invention. The system shown in FIG. 1 includes an adjustable shaping rail for shaping large single curvature membrane optics. FIG. 1 illustrates the device from a side view in a stowed configuration.

The embodiment of the device shown in FIG. 1 includes of a shaping rail 1 that fastens to one end of an optical membrane. Typically, a shaping rail is thin. Along these lines, the shaping rail typically has a thickness of about 0.1 inch to about 0.2 inch for a membrane having a thickness of about 0.002 inch. The thickness at least in part depends upon the size and mass of the membrane to ensure that the shaping rail can support the rail. Additionally, the shaping rail typically has a rectangular shaped cross-section. The length of the shaping can vary, depending at least in part upon the size of the membrane being supported thereon. The shaping rail may be made of any suitable material. Typically, the shaping rail is made of lightweight composite materials, metals, such as aluminum, invar, or any other lightweight and thermally stable material.

In the embodiment shown in FIG. 1, the shaping rail 1 is attached to a bending rail 2. The bending rail can act to facilitate generating a desired contour in the shaping rail. In this function, the bending rail can include one or more elements that can act as a surface against which the shaping rail can be drawn and/or act as a surface the acts on the shaping rail to shape the shaping rail. The elements attached to the bending rail can be moved to different locations along the bending rail to vary the location of the surface that acts on the shaping rail or that the shaping rail is drawn against to vary the shape induced in the shaping rail.

The form of the elements attached to the bending rail may vary. The embodiment shown in FIG. 1 includes a set of rollers 5 and 6 and a hinging pin 7. Rollers 5 are fastened on bending rail 2 and extend above or below shaping rail 1 allowing shaping rail 1 to translate relative to bending rail 2.

The hinging pin 7 may extend through a hinging pin receiving passage in both the bending rail and the shaping rail. The hinging pin can fix the bending rail and the shaping rail together, free to rotate but not translate. Some embodiments include another roller in place of the pin, such as the embodiment shown in FIG. 8, although a pin may facilitate locating the rails relative to each other.

FIG. 2 illustrates a top view of the embodiment shown in FIG. 1 still in the stowed configuration. To facilitate application of the bending moment from the bending rail to the shaping rail, the embodiment of the present invention shown in FIGS. 1 and 2 includes a bending adjustment bar 3. The bending adjustment bar may be operably connected to the shaping rail through bending bar standoffs 10.

To facilitate adjusting the bending moment applied to the shaping rail, compression adjustment bar may be attached to the standoffs with a clevis 8. The connection between the compression adjustment bar and the clevis may include a threaded connection that permits compression adjustment bar 3 to rotate at the attachment point relative to standoff 10. Depending upon the direction that the compression adjustment bar is turned, the distance between ends of the shaping rail will increase or decrease. Compression bar standoffs 9 are fastened near the ends of shaping rail 1.

The embodiment shown in FIGS. 1 and 2 includes a bending adjustment bar 3. The bending adjustment bar may be operably connected to the bending rail through bending adjustment bar standoff 10. To facilitate adjusting the force applied to the bending rail, bending adjustment bar may be attached to the standoffs with a clevis 8. The connection between the bending adjustment bar and the clevis may include a threaded connection that permits bending adjustment bar 3 to rotate at the attachment point relative to standoff 9. Depending upon the direction that the bending adjustment bar is turned, the distance between ends of the bending rail will increase or decrease. Bending adjustment bar standoffs 10 may fastened to near the ends of bending rail 2. FIG. 1a illustrates an end view of the structure shown in FIGS. 1 and 2.

Figure 4:
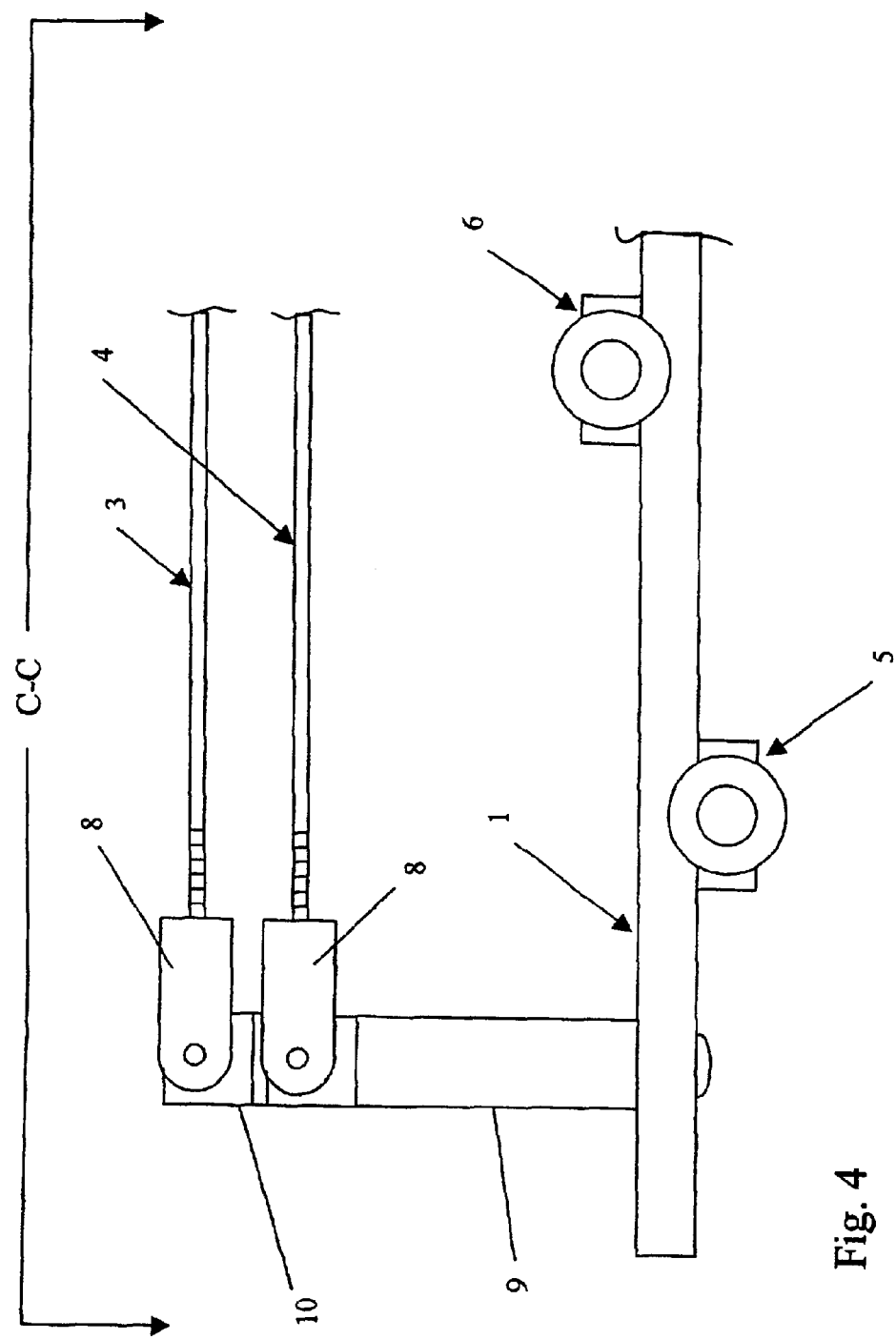
FIG. 4 represents a close-up side view of a portion of the embodiment shown in FIGS. 1–3 taken along line A—A shown in FIG. 2.
Figure 5:
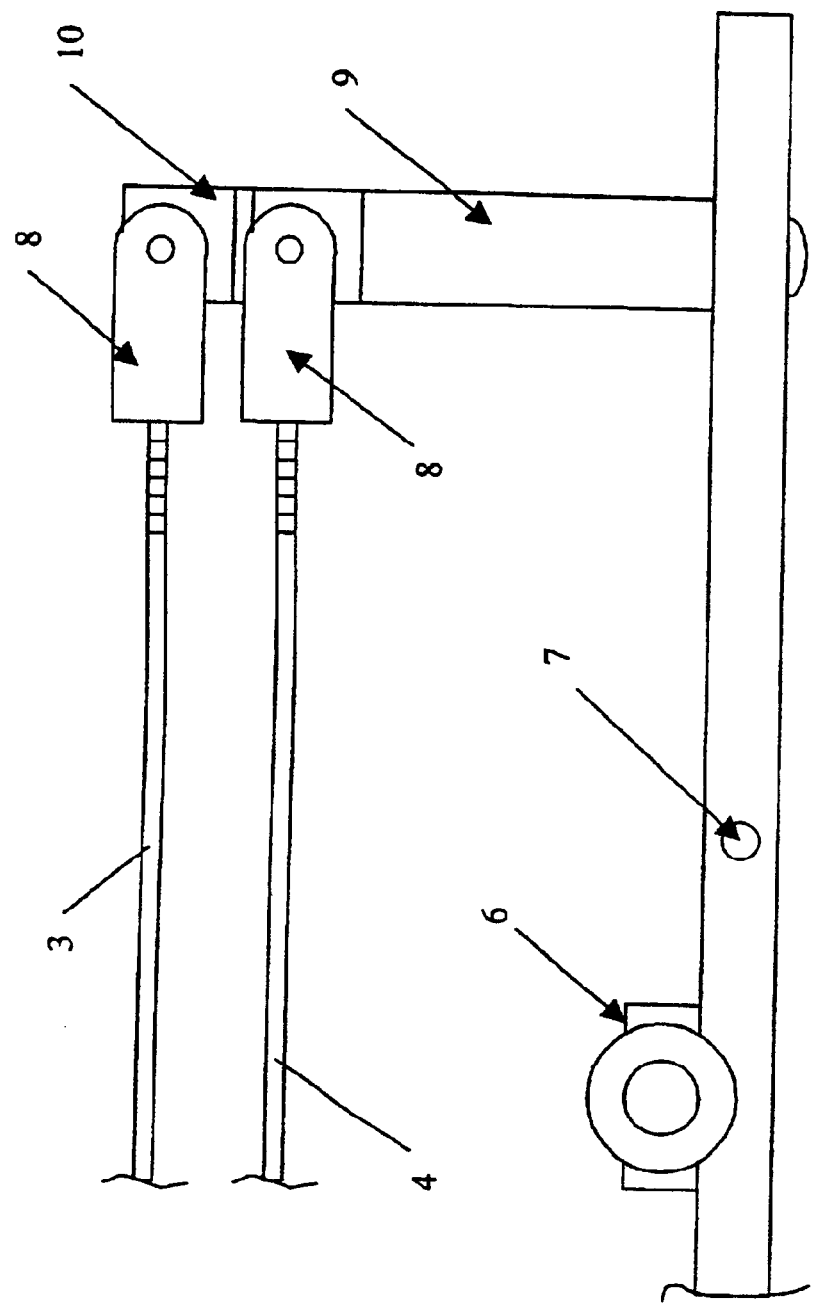
FIG. 5 represents a close-up side view of another portion of the embodiment shown in FIGS. 1–3 taken along line B—B shown in FIG. 2.
Figure 6:
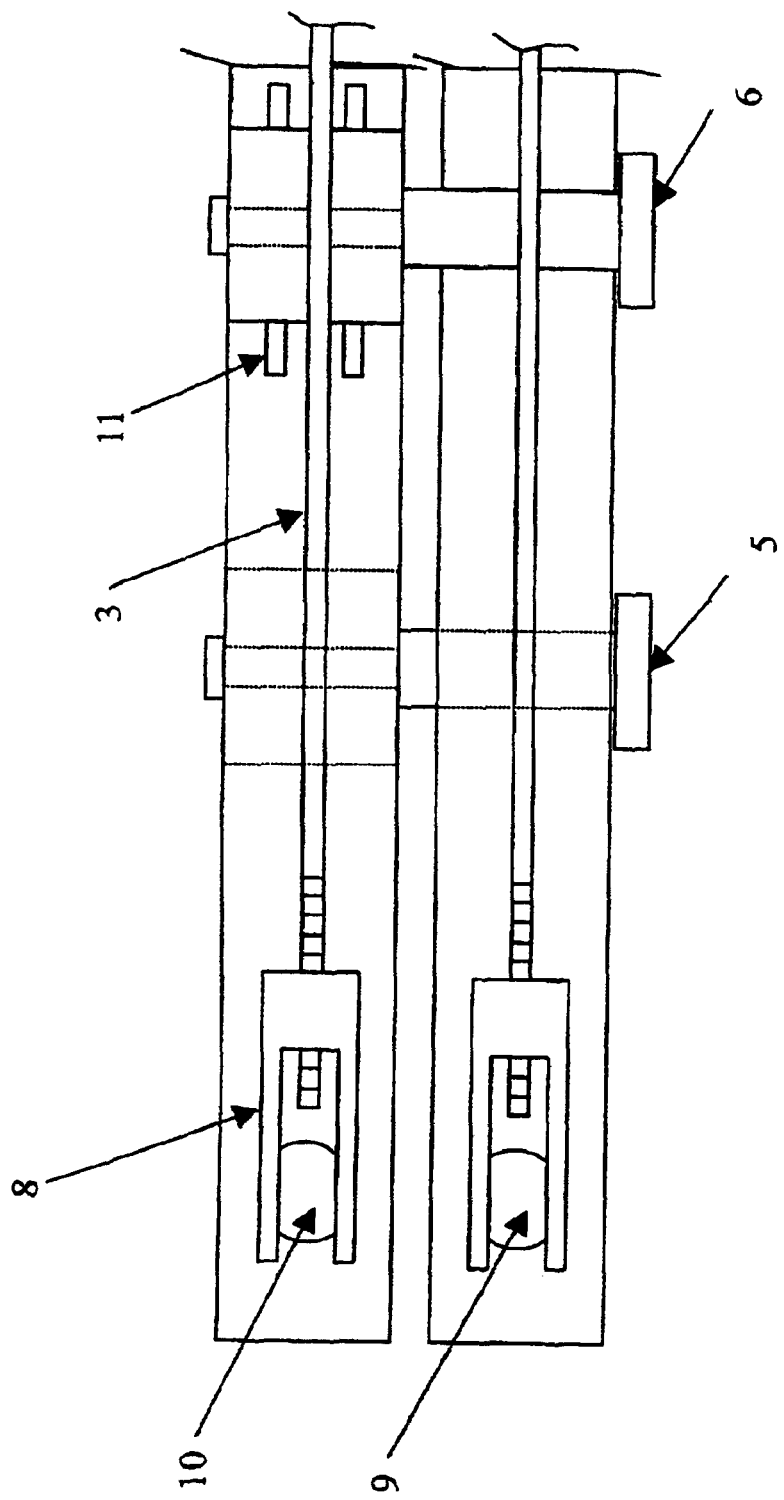
FIG. 6 represents a close-up top view of a portion of the embodiment shown in FIGS. 1–3 taken along line C—C shown in FIG. 4.
Figure 7:
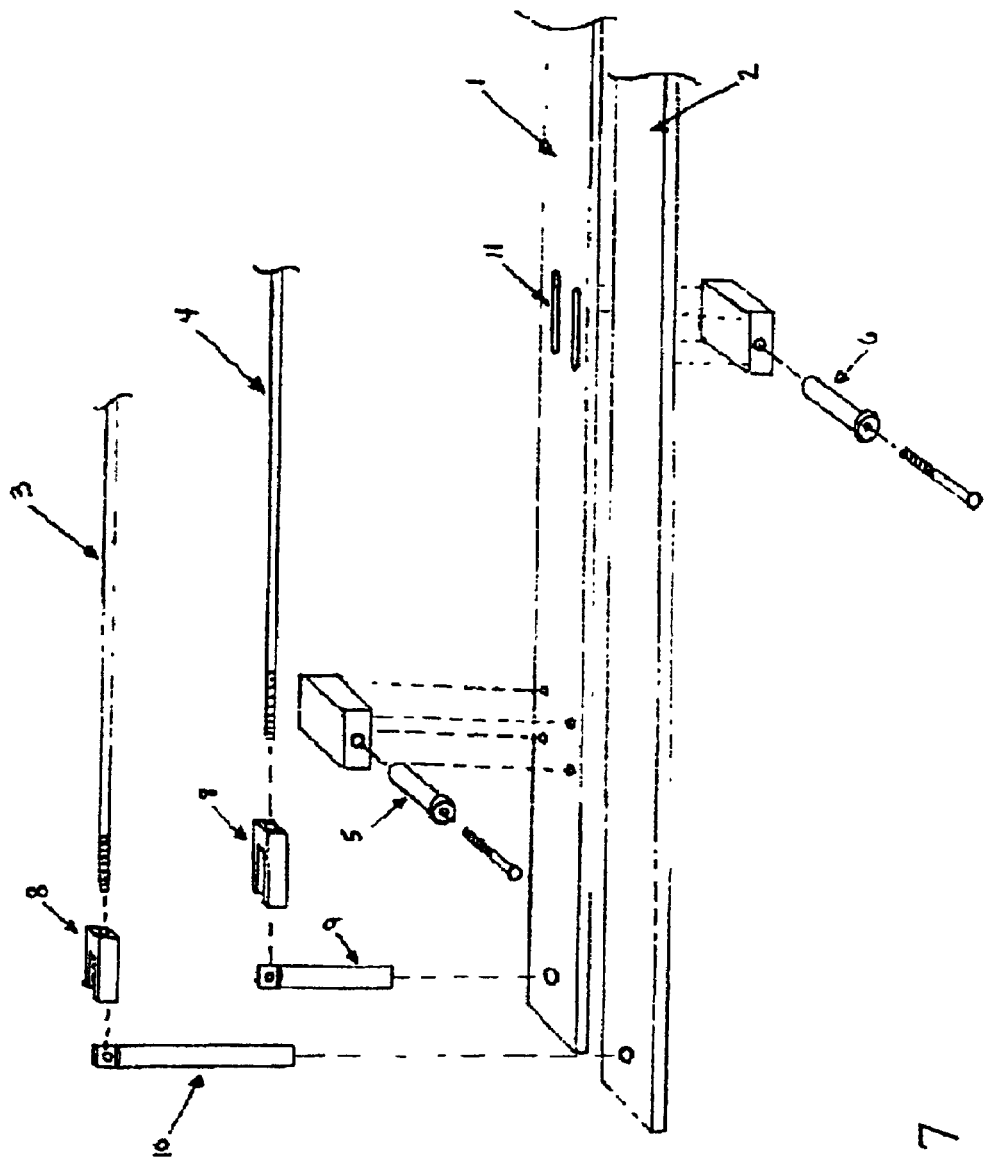
FIG. 7 represents an exploded view of a portion of the embodiment shown in FIGS. 1–6.

FIGS. 4–6 illustrate close-up cross sectional views of the interconnections between the shaping bar, bending bar, bending bar standing off, compression bar stand off, and clevis connections. Along these lines, FIG. 4 illustrates a close-up side view of the end of the structure shown in FIG. 2 and labeled A—A. FIG. 5 illustrates a close-up side view of the end of the structure shown in FIG. 2 and labeled B—B. FIG. 6 illustrates a close-up overhead view of the portion of the structure shown in FIG. 4. Along these lines, FIG. 6 shows adjustment slot 11, which can be included in the shaping rail and/or the bending rail at any location where a roller is mounted. By sliding one or more rollers along the slot, the contour applied to the shaping rail can be altered. FIG. 7 illustrates an exploded view of the portion of the structure shown in FIGS. 4 and 6.

The embodiment shown in FIGS. 1–6 generates curvature in the shaping rail 1 primarily though the adjustment bars 3 and 4. Advancing the threads on bending adjustment bar 3 produces a load pair though rollers 5 and 6, which results in a nearly pure moment on the interior of shaping rail 1. Fine adjustments to the applied moment can be made by changing the location of roller on adjustment slot 6. The applied moment creates a constant radius of curvature region on shaping rail 1 between the innermost rollers 5 and 6. Thus, a circular arc is achieved.

The circular shape can subsequently be corrected to more precisely parabolic by advancing the threads on compression adjustment bar 4. This produces an in-line compression on shaping rail 1. In combination with the existing circular curvature of shaping rail 1, a specific distributed moment is produced within shaping rail 1, which acts to generate a parabolic shape.

As a alternative method of adjustment, the height of compression bar standoff 9 can be adjusted separately between the two ends of shaping rail 1 resulting in another means of ntroducing an distributed moment on shaping rail 1 potentially producing an off-axis based parabola. This distributed moment can be tuned to make the slight modification necessary to bring the figure of shaping rail 1 into parabolic shape to very high accuracy.

Figure 12:
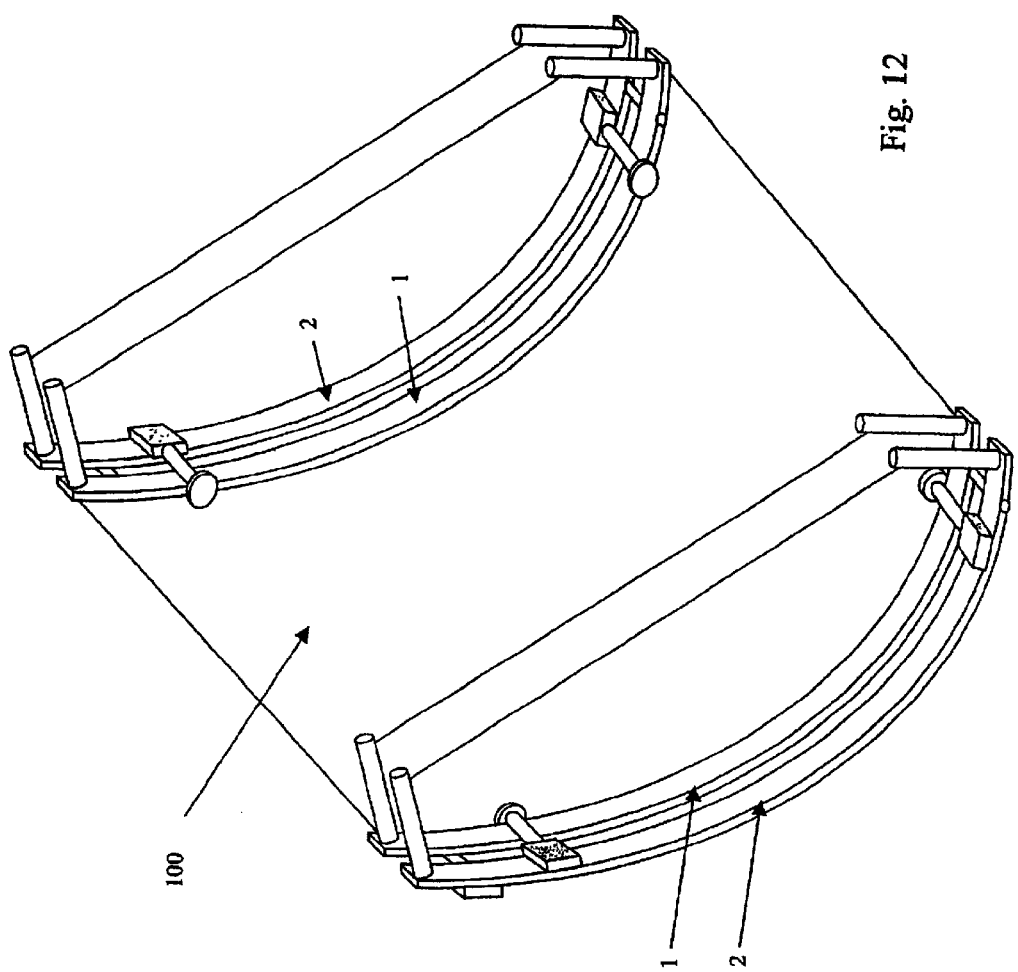
FIG. 12 represents a perspective view of an embodiment of an optical membrane stretched between two adjustable rail assemblies according to the present invention.

FIG. 3 illustrates the embodiment shown in FIGS. 1 and 2 in a deployed configuration. An optical membrane is stretched between two or more of the adjustable rail for shaping large single curvature parabolic membrane optic devices to achieve an adjustable membrane mirror system. FIG. 12 illustrates a membrane 100 stretched between the two adjustable rail assemblies.

Figure 11:
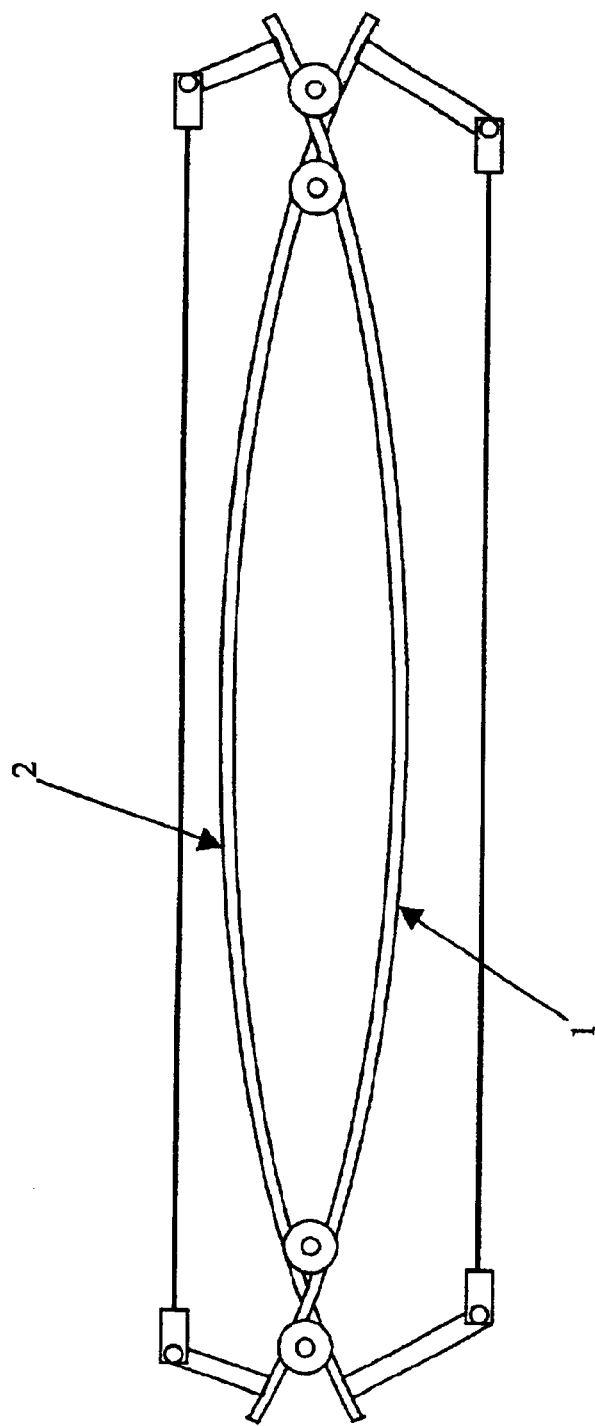
FIG. 11 represents a side view of another embodiment of an adjustable rail system according to the present invention.

FIG. 11 illustrates an alternative configuration of the shaping rail and the bending rail. This configuration maybe utilized regardless of whether the embodiment shown in FIGS. 1–6 or FIG. 8 is utilized. In the arrangement shown in FIG. 11, either the bending adjustment bar and the compression adjustment bar are arranged on opposite sides of the shaping rail and bending rail. The application of bending and/or compressing force on the bending rail or shaping rail will be applied by adjusting the bending adjustment bar or compression adjustment bar in an opposite direction as compared to the arrangement shown in FIGS. 1–6, for example.

Figure 8:
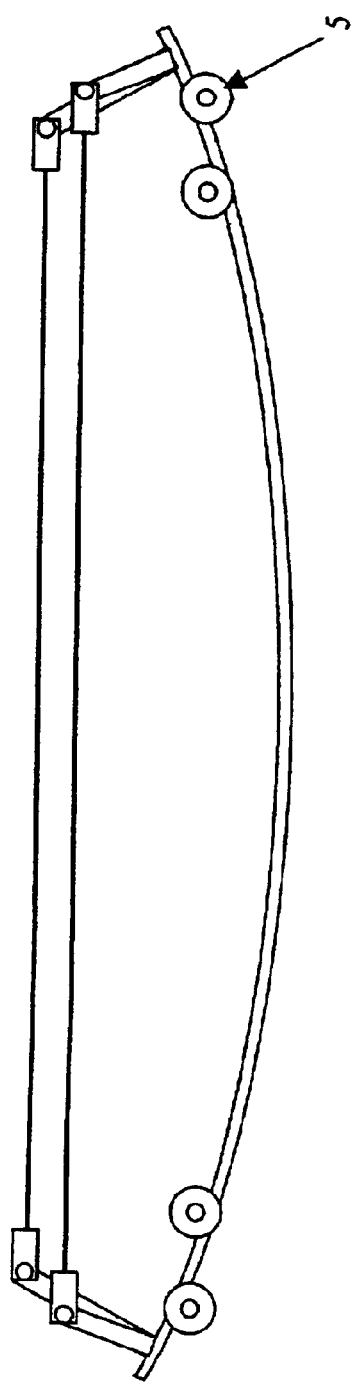
FIG. 8 represents a side view of another embodiment of an adjustable rail system according to the present invention.

FIG. 8 illustrates an alternative embodiment of the present invention in a deployed configuration. The embodiment includes two pairs of rollers.

The present invention also includes a method for shaping a single curvature membrane optic. According to the method, curvature is generated in a shaping rail by applying a load in the vicinity of a first end and a second end of the shaping rail. An optical membrane is stretched between at least two shaping rails. Typically, the curvature generated in the shaping rails is parabolic. However, in some cases, another curvature may be desired.

The load may be applied to the shaping rail by drawing the first end and the second end of the shaping rail toward each other. As the ends of the shaping rail are drawn toward each other, the shaping rail may be drawn against at least two rollers fixed to a bending rail operably connected to the shaping rail. The position of a least one roller may be adjusted to adjust a moment applied to the shaping rail, providing capability to produce an off-axis parabola.

An embodiment such as that shown in FIGS. 1–6 may be assembled as follows. Bending adjustment bar 3 may be attached to the ends of bending rail 2. Compression adjustment bar 4 may be attached to the ends of shaping rail 1. Bending rail 2 may be attached to shaping rail 1 through a set of rollers 5 and 6 and hinging,pin 7.

The functioning of the embodiment shown in FIGS. 1–6 may be described as follows. Shortening the length of bending adjustment bar 3 bends the bending rail 2. Bending rail 2 thereby transmits a pair of forces through the attaching rollers and pin 5, 6, and 7 causing a nearly pure moment into shaping rail 1. This results in the shaping rail taking on the curvature and shape of a constant curvature circular arc. Small corrections to the shape can then be made by adjusting the length of compression adjustment bar 4, which is attached to the ends of shaping rail 1. Adjustments to the length of compression adjustment bar 4 cause a compressive load into shaping rail as well as a small modification to the moment distribution in the shaping rail. The deformation induced is a small correction to the circular arc shape, which results in a more accurate on-axis parabolic shape.

Off-axis parabolic shapes may be achieved in a manner similar to that already described but with the additional adjustment of moving one of the roller locations 5 relative to the other roller, and/or by changing the height of one of the compression bar standoffs 10 relative to the other compression bar standoff.

Figure 9:
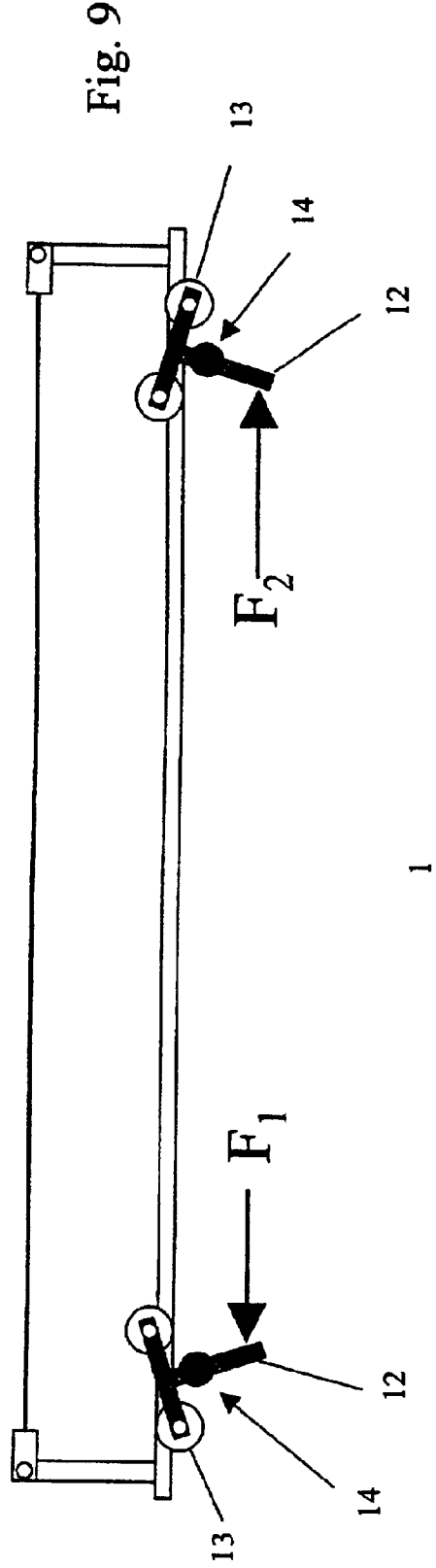
FIG. 9 represents a side view of a further embodiment of an adjustable rail system according to the present invention.
Figure 10:
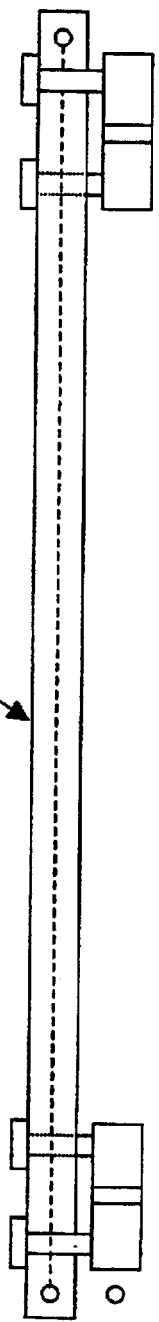
FIG. 10 represents an overhead view of the embodiment shown in FIG. 9.

FIG. 9 illustrates a side view of another embodiment of the present invention. According to this embodiment, the bending rail 2 shown in FIGS. 1–7 has been replaced by a torsional spring or rocker bar 12 arranged at each end of the shaping rail. Each rocker bar includes a pair of rollers or pins 13, wherein the rollers or pins on each rocker bar are arranged on opposite sides of the shaping rail so as to permit the force to be applied to the shaping bar to change its contour. Each rocker bar 12 is attached to a supporting structure (not shown) at a hinged mount 14. Each rocker bar applies force F to the shaping bar. The force is supplied from the supporting structure, such as a from a lead screw. One advantage of this embodiment is that it may be a more lightweight design for large apertures since the rocker assembly is typically only located at the two ends of the shaping rail, while the bending rail needs to transverse the entire length of the FIG. 10 illustrates an overhead view of the embodiment shown in FIG. 9.

Figure 13:
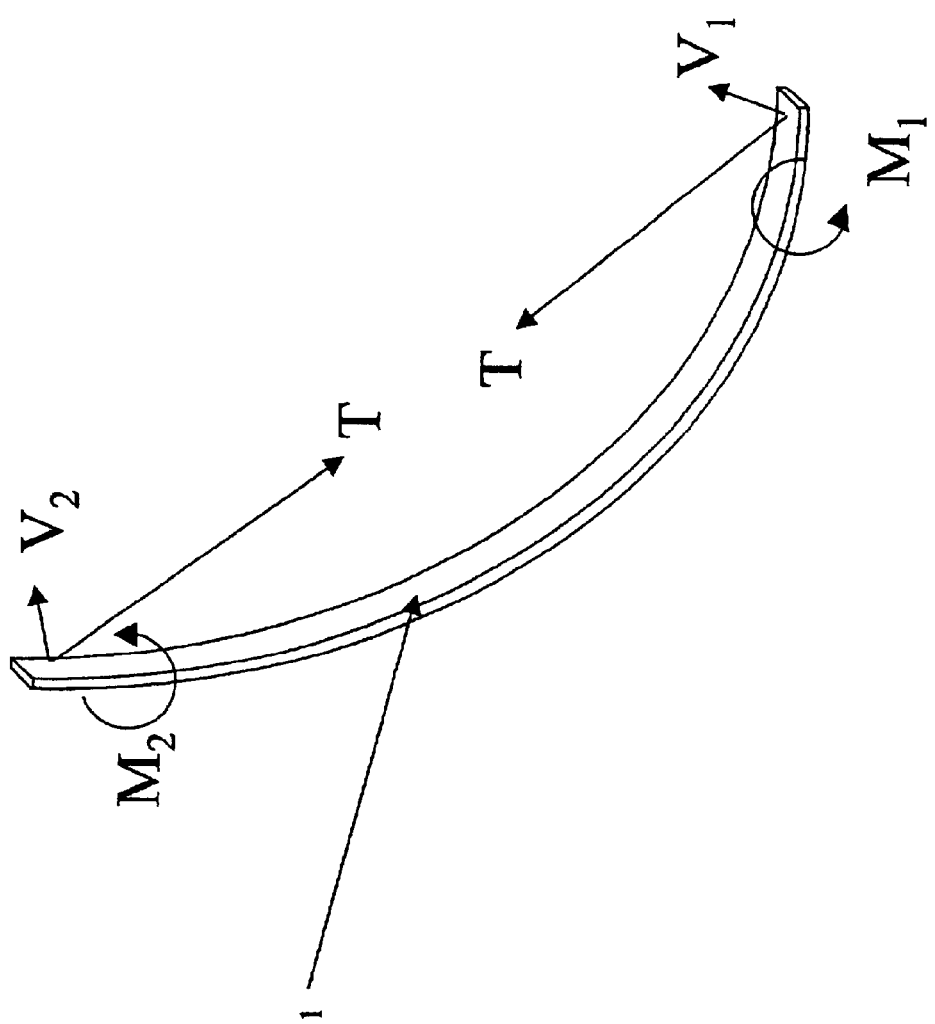
FIG. 13 represents a shaping rail according to the present invention and the loads on the shaping rail.

FIG. 13 illustrates general loading on an embodiment of a shaping rail 1 for the embodiment of the present invention shown in FIGS. 1–7 to give the shaping rail a parabolic shape. The Tension T, Moments M and Shear V may be adjusted in specific ratio relative to each other in order to give a high accuracy parabolic shape. For an on-axis parabola, M1=M2 and V1=V2=0. A purpose of the bending rail 2 is to impose the moment and shear to the shaping rail 1. Alternate embodiments utilize different structure to introduce these moments and shears onto the shaping rail 1.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

I claim:

1. A system for shaping a single curvature parabolic membrane, the system comprising:
   a shaping rail;
   a bending rail;
   at least two rollers operably connecting the shaping rail and the bending rail, the rollers being operable to alter a position of the shaping rail relative to the bending rail;
   a compression adjustment bar operably connected to ends of the shaping rail to apply a load to the shaping rail; and
   a bending adjustment bar operably connected to ends of the bending rail to apply a moment to the shaping rail through the at least two rollers.

2. The system according to claim 1, wherein the system is operable to form the shaping rail into a substantially parabolic shape.

3. The system according to claim 1, wherein in a stowed configuration the bending rail is parallel to the shaping rail and in a deployed configuration the bending rail is not parallel to the shaping rail.

4. The system according to claim 3, wherein in the deployed configuration the shaping rail has a substantially parabolic shape.

5. The system according to claim 1, wherein the rollers are fixed to the bending rail and roll along the shaping rail as the position of the shaping rail relative to the bending rail is altered.

6. The system according to claim 5, wherein the two rollers are arranged spaced apart in the vicinity of one end of the bending rail and the shaping rail.

7. The system according to claim 1, further comprising:
   a hinge pin interconnecting the shaping rail and the bending rail and operable to permit the shaping rail and the bending rail to rotate relative to each other.

8. The system according to claim 7, further comprising:
   a third roller arranged spaced apart from and in the vicinity of the hinge pin and operable to alter a position of the shaping rail relative to the bending rail.

9. The system according to claim 7, wherein the hinge pin is arranged in the vicinity of a first end of the shaping rail and the bending rail and the two rollers are arranged in the vicinity of a second end opposite the first end.

10. The system according to claim 1, further comprising:
    an adjustment bar operably connected to ends of the bending rail to apply a load to the shaping rail through the rollers.

11. The system according to claim 1, further comprising:
a pair of bending bar standoffs operably connecting the bending adjustment bar to the bending rail.

12. The system according to claim 11, wherein each bending bar standoff is pivotably connected to the bending adjustment bar.

13. The system according to claim 11, wherein a distance between each end of the bending adjustment bar and the adjacent bending bar standoff is adjustable.

14. The system according to claim 13, further comprising:
a clevis operable to adjustably connect each end of the bending adjustment bar to a bending bar standoff.

15. The system according to claim 14, further comprising:
a threaded connection on each end of the bending adjustment bar and on each clevis operable to adjustably connect the bending adjustment bar to the bending bar standoffs.

16. A large single curvature parabolic membrane optic, comprising:
at least two membrane shapers, each shaper comprising a shaping rail, a bending rail, at least two rollers operably connecting the shaping rail and the bending rail, the rollers being operable to alter a position of the shaping rail relative to the bending rail, and a bending adjustment bar operably connected to ends of the bending rail to apply a load to the shaping rail through the rollers;
a compression adjustment bar operably connected to the shaping rail to apply corrective compressive loads and moments to the shaping rail; and
an optical membrane stretched between the at least two membrane shapers.

17. A system for shaping a single curvature parabolic membrane, the system comprising:
a shaping rail having a first end and a second end, the first end and the second end of the shaping rail being operably connected to each other such that the ends of the shaping rail may be brought closer together through application of a bending moment and in-line compression;
a bending rail;
at least two rollers operably connecting the shaping rail and the bending rail, the rollers being operable to alter a position of the shaping rail relative to the bending rail; and
a bending adjustment bar operably connected to ends of the bending rail to apply a load to the shaping rail through the rollers.

18. A method for shaping a single curvature membrane optic, the method comprising:
generating curvature in a shaping rail by applying a load and a moment in the vicinity of a first end and a second end of the shaping rail;
stretching an optical membrane between at least two shaping rails;
drawing the first end and the second end of the shaping rail toward each other and drawing the shaping rail against at least two rollers fixed to a bending rail operably connected to the shaping rail.

19. The method according to claim 18, wherein the curvature is parabolic.

20. The method according to claim 18, further comprising:
drawing the shaping rail against at least two rollers fixed to a bending rail operably connected to the shaping rail.

21. The method according to claim 20, further comprising: altering a position of a least one roller to adjust a moment applied to the shaping rail.

22. The method according to claim 20, further comprising:
applying an in-line compression to the shaping rail.

23. The method according to claim 22, further comprising:
adjusting the in-line compression to produce an off-axis parabolic in the shaping rail.

24. The method according to claim 22, wherein applying an in-line compression to the shaping rail comprises:
drawing the first end and the second end of the bending rail toward each other.

25. The method according to claim 20, further comprising:
altering a height of a compression bar standoff to modify the moment and a shear applied at one end of the shaping rail.

26. The method according to claim 25, wherein the curvature generated is off-axis parabolic.

27. The method according to claim 20, further comprising:
altering a distance between the at least two rollers to modify the moment and a shear applied at one end of the shaping rail.

28. The method according to claim 27, wherein the curvature generated is off-axis parabolic.

29. The method according to claim 18, wherein drawing the first end and the second end of the shaping rail toward each other comprises:
drawing toward the first end and second end of the shaping bar ends of an adjustment bar operably connected to the first and the second end of the shaping bar.

30. The method according to claim 18, wherein drawing the first end and the second end of the shaping rail toward each other comprises:
drawing ends of an adjustment bar toward ends of bending bar standoffs operably connecting the adjustment bar to the shaping bar.

* * * * *